US009841001B2

(12) United States Patent
Richards (10) Patent No.: US 9,841,001 B2
(45) Date of Patent: Dec. 12, 2017

(54) BANDED TURBINE

(71) Applicant: William R. Richards, Springfield, VA (US)

(72) Inventor: William R. Richards, Springfield, VA (US)

(*) Notice: Subject to any disclaimer, the term of this patent is extended or adjusted under 35 U.S.C. 154(b) by 0 days.

(21) Appl. No.: 13/954,255

(22) Filed: Jul. 30, 2013

(65) Prior Publication Data

US 2013/0315702 A1     Nov. 28, 2013

Related U.S. Application Data

(63) Continuation of application No. 12/457,602, filed on Jun. 16, 2009, now Pat. No. 8,496,428.

(60) Provisional application No. 61/061,926, filed on Jun. 16, 2008.

(51) Int. Cl.
*F03D 1/06*     (2006.01)
*F03D 1/02*     (2006.01)

(52) U.S. Cl.
CPC ............. *F03D 1/02* (2013.01); *F03D 1/0608* (2013.01); *F05B 2240/33* (2013.01); *F05B 2260/63* (2013.01); *Y02E 10/721* (2013.01)

(58) Field of Classification Search
CPC ................. F03D 1/0625; F03D 1/0666; F05B 2240/2211; F05B 2240/33
USPC ................ 415/4.2, 4.3; 416/194, 195, 196 A
See application file for complete search history.

(56) References Cited

U.S. PATENT DOCUMENTS

| 1,334,485 | A | * | 3/1920 | Clipfell | F03D 7/0224 |
| | | | | | 290/44 |
| 4,220,870 | A | * | 9/1980 | Kelly | 290/44 |
| 4,319,865 | A | * | 3/1982 | Richard | 416/41 |
| 4,330,714 | A | | 5/1982 | Smith | |
| 5,315,159 | A | * | 5/1994 | Gribnau | 290/55 |
| 5,632,599 | A | | 5/1997 | Townsend | |
| 6,064,123 | A | | 5/2000 | Gislason | |
| 6,749,399 | B2 | | 6/2004 | Heronemus | |
| 7,075,189 | B2 | | 7/2006 | Heronemus et al. | |
| 7,183,664 | B2 | | 2/2007 | McClintic | |
| 7,484,363 | B2 | | 2/2009 | Reidy et al. | |
| 2003/0235493 | A1 | * | 12/2003 | Keyvani | 415/4.1 |
| 2005/0082839 | A1 | * | 4/2005 | McCoin | F03D 1/025 |
| | | | | | 290/55 |
| 2006/0275121 | A1 | * | 12/2006 | Merswolke | F03D 1/0608 |
| | | | | | 416/132 B |
| 2007/0041823 | A1 | * | 2/2007 | Miller | 415/4.1 |

(Continued)

FOREIGN PATENT DOCUMENTS

JP     4-237878 A     8/1992

*Primary Examiner* — Sean J Younger
(74) *Attorney, Agent, or Firm* — Mattingly & Malur, PC (57) ABSTRACT

A banded turbine configuration has an integral outer band support structure capable of providing two point simple support for a multiplicity of blades. A large scale vertical array has a set of twelve 23 m-diameter banded turbines with up to nine blades and resting on an Open Web Steel Joist (OWSJ) platform. The banded turbine configuration is supported off of a main shaft hub assembly, which is supported by forward and aft pillow block bearing assemblies. The banded turbine allows for a protective screen for bird- and bat-kill prevention. Each banded turbine employs DC alternators to provide a switchable output which is subsequently fed to a dedicated set of high efficiency grid-compatible solid state invertors or, alternatively, to energy storage.

13 Claims, 8 Drawing Sheets

(56) References Cited

U.S. PATENT DOCUMENTS

| | | |
|---|---|---|
| 2007/0102934 A1 | 5/2007 | Pescarmona et al. |
| 2007/0138797 A1 | 6/2007 | Reidy et al. |
| 2007/0166159 A1* | 7/2007 | Williams ................. 416/10 |
| 2008/0042444 A1* | 2/2008 | Johnson ................. 290/54 |
| 2008/0069696 A1* | 3/2008 | Ball ................. 416/132 B |

* cited by examiner

Figure 2 Detail A

BANDED TURBINE

CROSS REFERENCES TO RELATED APPLICATIONS

This application is a continuation of U.S. patent application Ser. No. 12/457,602, filed Jun. 16, 2009, which claims the benefit of U.S. Provisional Application No. 61/061,926, filed Jun. 16, 2008 by the same inventor as herein, the entire disclosure of which is incorporated herein by reference.

BACKGROUND OF THE INVENTION

Field of the Invention

The present invention relates generally to a wind energy extraction mechanism with the following features versus prior art embodiments having the same blade swept area: up to 2.5× overall efficiency; up to 3× power density (kg/kW); over 30 dB(A) airborne noise level reduction and elimination of infrasonic noise level generation; over 16× the reliability, due to elimination of prior art failure causal mechanisms; greatly enhanced ease of maintenance and repair; greatly simplified manufacturing, shipping, installation and erection capability; up to 3× reduction in the cost to manufacture; design robustness re dynamic wind gust, cyclic loading and sustained high-wind induced stresses on the tower Overturning Moment and Base Shear Force capabilities; up to 2.4× speed of response (yaw rate) to changing wind direction; 94% reduction of flicker; and elimination of bat and bird kill potential.

Description of Related Art

Horizontal-axis wind turbines (HAWTS) are susceptible to the Betz Limit criteria (i.e., $^{16}/_{27}$ths), whereby they lose at least 41% of the theoretical extractable energy from wind velocity. Thereafter, the energy extraction process is solely dependent on the turbine overall efficiency. The turbine overall efficiency ($\eta_o$) consists of blade aerodynamic efficiency ($\eta_b$) times the associated mechanical efficiency ($\eta_m$) times the electrical conversion process efficiency ($\eta_e$) to produce the resultant electrical power. These efficiency terms are combined into an expression to determine the maximum extractable energy in Watts/m$^2$ vs. the wind or current velocity. This relationship can be represented by the following expression:

$$\text{Watts/m}^2 = 0.50 \times (\rho, \text{kg/m}^3 \times (\text{wind vel.,m/sec.})^3 \times \text{Betz Limit} \times \eta_o$$

where $\rho = 1.225$ kg/m$^3$ at sea level elevation and 68° F. or Watts/m$^2 = 0.363 \times (\text{wind vel., m/sec.})^3 \times (\eta_b \times \eta_m \times \eta_e)$.

Current wind turbine industry practice is to measure the output power from their generators without consideration of the power conditioning and conversion processes necessary for establishing grid compatibility. The reported total Watts generated is then simply divided by the rotor swept area to determine the specific energy at that wind velocity. These curves are then used in sales brochures to present documented performance capabilities. Unfortunately, this practice assumes that energy is being uniformly extracted over the entire swept area. This is not the case, as the rotor delivery torque times the rotor RPM is proportional to the input power supplied to the gearbox. The torque is composed of the summation of lift and drag forces acting at varying distances along the blade from the rotor hub to the tips. These forces are proportional to the rotational velocity$^2$ at any particular distance from the hub. Integration of the resultant torque as a function of incremental distances along the blade will show that ~90% of the energy extracted is being provided by the outer 30% of the rotor disc (or ~49% of the area). This leads to the surprising conclusion that the past practice of using the entire swept area of the rotor disc to estimate the energy extracted must be reduced by half, revealing that reports of blade performance aerodynamic efficiency are ~2× higher than is actually the case.

It is evident that wind velocities remain essentially unchanged as they pass through the inner 70% of the rotor disc of conventional wind turbines, causing large flow-field discontinuities downstream. Mixing of the highly disturbed outer flow field with that of the essentially undisturbed inner flow field generates swirling eddies downstream of the rotor.

The lift/drag ratio ($C_L/C_D$) of the blade determines its aerodynamic efficiency ($\eta_b$). This ratio is usually low, because a sufficiently strong blade cannot be created to resist the induced bending without a large section modulus. A large section modulus requires thick blade sections, typically 25% to 35% of the chord dimension, generating excessive drag. The resultant $C_L/C_D$ is typically below 44, yielding an aerodynamic efficiency of 42% to 48%. A high efficiency thin section blade, such as the NACA 6412, with a $C_L/C_D$ of >110, cannot be used in current large two and three blade wind turbines because of this strength requirement.

The mechanical efficiency ($\eta_m$) is primarily reflected in the turbine gearbox used to convert the 16-25 RPM of the multi-bladed rotors to 1200 RPM and higher, in order to drive one-to-four generator assemblies. These high-ratio, multistage gearboxes are required to achieve the desired 50:1 to 75:1 speed increases. As each stage is only 98.5%±0.5% efficient, a four-stage gearbox would therefore have a maximum efficiency of 92% to 96%.

The electrical efficiency ($\eta_e$) consists of both the generator efficiency and the efficiency of the associated conversion process needed to achieve the high voltage, 3-phase, 60 Hz power for grid compatibility. Typical high performance generator efficiency is 88% to 92% for either AC or DC embodiments. With a transformer, for use with an AC generator, the efficiency is typically 96.5% to 98.5%, yielding a net overall average of 88%. With use of a DC generator, with an efficiency of 88% to 92% and a solid state inverter with efficiency of 97% to 98%, the net overall average remains at 88%.

In summary: a blade efficiency of 45%, a gearbox efficiency of 96%, and a power generation and conversion efficiency of 88% yields a net system overall efficiency of 38%, or $(\eta_b)(\eta_m)(\eta_e) = \eta_o$. A tabulation of the performance for these prior art designs would confirm this value for the net overall efficiency and show that, once the Betz Limit is included, the total specific energy extracted is approximately 22.5% of the theoretical wind energy.

Analysis of Related Art

Existing prior art HAWT designs, such as the Vestas V80-2.0 MW wind turbine, have an overall weight of ~1080 tons, including a rotor at 90 tons, nacelle weight with rotor of ~150 tons, 80-meter tall tower of 170 tons, and a foundation of 760 tons. The yaw drive assemblies must be capable of handling a 150-ton nacelle load, with rotational inertia of ~60×10$^6$ kg-m$^2$, and are presently limited to slewing rates of ~0.5 degree/sec.

The logistical and infrastructure required to move such large assemblies to remote wind farms demands high load capacity roadways for the transport vehicles and constitutes a major Balance of Station cost for new installations. Roadways must be engineered to support the passage of 330-ton crawler cranes and Restricted Access Vehicles (RAVs) with a very large turning radius. Also, the logistical impact with respect to traffic congestion in the site of the wind farm is severe, with up to 120 one-way trips for material and equipment per MW of installed capacity. Each tower must have a cleared 1.5-acre lay down area to permit on-site preassembly of the wind turbine rotors and placement of the blades, nacelle, and three or more tubular steel tower sections onto two separate foundations: a smaller foundation for use in rotor preassembly and the larger 760-ton foundation for the wind turbine tower itself.

HAWT wind turbines are complex structural assemblies with many eigenvalues. This complexity, coupled with little or no structural damping (<3% hysteretic), makes them highly susceptible to blade/rotor interactions with the tower structure, potentially leading to multiple modes of forced vibratory response. Near-resonance exciting forces can drive the rotor blades into large displacement amplitudes that can lead to catastrophic failure from excessive bending stresses. These vibratory amplitudes are then hard-coupled into the gearbox, and subsequently into the generator assembly. Neither of these assemblies is designed to withstand such amplified forces that, due to the lack of appreciable damping, can be multiplied by a factor of 20× or more.

HAWT rotor blades, weighing up to 30 or more tons, are extremely complex, and expensive tooling of their composite materials contributes to their high cost of fabrication. They are susceptible to catastrophic over-speeding in high wind conditions, resulting in serial failure in their redundant pitch controlled furling, blade tip air brakes, and/or main shaft braking systems. Additional catastrophic, life-threatening, failures occur when stress fractures result in to thrown blades, generating massive imbalance, leading to destruction of the component elements within the nacelle, and ultimately to blade impact with the steel tower and its resultant destruction.

The power takeoff point from the rotor main shaft is very difficult to access for performing maintenance and repair operations. The major mechanical and electrical components, including the gearbox (~36 tons), rotor assembly (~90 tons) and generator assembly (3 to 6 tons), are typically packed into a cramped nacelle, located 65 to 125 meters above ground. Major repairs require a 330-ton crawler crane to remove the rotor and nacelle from the tower.

HAWTs typically require heavy, multi-stage gearboxes at speed increase ratios from approximately 65:1 up to >85:1 for driving the generator(s). Both the gearboxes and the generators are highly susceptible to expensive and time-consuming failures, typically occurring within the first 2-to-3 years. The inability of the Industry to achieve theoretical lifetime goals of 20 years or more for gearbox reliability is forcing a number of wind turbine manufacturers to look at alternative approaches, such as direct-coupled low speed permanent magnet generator configurations. Unrealized goals for mean time between failures, mandating warranty periods limited to 1-2 years, and high operating and maintenance costs for gearboxes, are directly traceable to gear teeth or bearing failures caused by unexpected overload conditions, and/or failure of the lubrication system.

Existing HAWT gearbox designs are manufactured to the highest precision levels (AGMA class 12 and 13), requiring expensive tooling and time-consuming manufacturing processes to meet the design tolerances. Before shipment, a mandatory 24-hour "run-in" is performed to observe the increased particle count generated over time in the recirculated lubrication oil, to assess the efficiency of the filtration system and the degree of "wearing-in" of the gearbox itself. Although this process noticeably improves the operating efficiency of the gearbox in the relatively short time of 24 hours, once the particles are generated, they immediately initiate micro-pitting and accelerated wear.

The gearboxes are highly sensitive to loss of lubricity at temperatures above 180° F., causing the accumulation of gum and varnish, accelerating tooth wear and the buildup of backlash, and increasing failure from sudden overload conditions. The result is catastrophic tooth failure. The recirculation system must be pervasive throughout the gear train in order to mitigate hot spot generation while removing up to 360,000 BTUH from the gearbox at maximum loading. Additionally, a large 1.5 MW gearbox might typically hold 200 gallons of lubrication oil, which must be changed out semi-annually. In the event of a leak or rupture in the gearbox case, or in the associated piping recirculation and filtration system, a cleanup/remediation effort must be initiated.

These gearboxes must be sized for delivery of high levels of torque at low input speeds. They are typically sized at ~500,000 ft-lbs with a minimum 1.25× design factor-of-safety input torque for a 1.5 MW size wind turbine rotating at a speed of ~21 RPM. Unfortunately, this safety factor is not nearly sufficient to cope with the highly variable and very large imposed loads being transmitted into the gearbox by the rotor assemblies, which is a primary causal mechanism for inducing gearbox failures.

Gearbox failure is instigated primarily by bending or deflection of up to 1.5 meters for a 40-meter blade length, as the blades move from Top Dead Center (TDC) to Bottom Dead Center (BDC) with each rotation. Blade loading shifts rapidly as the blades attempt to accommodate a velocity profile that is spread over an elevation difference of 80 meters or more. Assuming Class 4 wind conditions and a $\frac{1}{7}^{th}$ power wind shear exponent, with a 5.8 meter/sec wind velocity at a reference elevation of 10 meter hub height, the BDC position of an 80 meter diameter rotor on a 90 meter tall tower would be 50 meters, and its velocity would be 1.259 times 5.8, or 7.3 meter/sec. However at the TDC position, the velocity would be 1.369 times 5.8, or 7.94 meters/sec. As the theoretical energy of the wind is proportional to the velocity cubed, the watts/$m^2$ to be absorbed is 1.287× higher at TDC. This higher force component bends the blade backwards toward the tower. As the blade circles to BDC, the blade is unloaded and bends away from the tower. This constant bending fluctuation leads to a very large number of cumulative fatigue cycles in a very short time. Typically, accumulated fatigue cycles over a period of one year would exceed ten million, assuming a nominal 21 RPM rotating speed for an 80 meter diameter rotor with a Tip Speed Ratio of 6.4, and an average annual wind velocity of 7.3 meters/sec. The magnitude of the fatigue cycle is equivalent to a 1.5 MW size wind turbine assembly operating with a ±28.7% "torque ripple" pulse per blade at a frequency of approximately one Hertz. This torque ripple alone can induce early gearbox failure. However, coupled with wind gusts of a similar magnitude (or ±28.7% of average wind speed) the cumulative effect of the second term would result in doubling the velocity. This yields an 8× increase in the fluctuating wind energy (due to the velocity cubed effect) or 2.30 times the nominal design loading with each cycle. Providing a sound mechanical design for this overload condition is a formidable challenge, and appears to be one of the most likely reasons that a large number of wind turbines are laying idle, awaiting repair.

At the 6.0× to 6.4× tip speed ratios of current turbines, the resultant wind velocity is a primary causal mechanism of noise generation and generation of violent turbulent eddies and swirl effects off the blade tips. The separation of the trailing edges of the blade generate mid-frequency audible tones—the "swoosh, swoosh" noise of the blade passing in front of the tower. Because acoustic noise generation increases as the fifth power of RPM, a doubling of RPM yields a 32-dBA increase. Blade tip speeds are proportional to the number of blades; a 3-bladed wind turbine with a TSR of 6.4 and an 80 m rotor diameter yields an equivalent RPM of 21 and a tip speed of 200 mph. Obviously, the bird kill potential for these prior art designs is also quite high.

The turbulent eddy and swirl of these prior art HAWT designs exacerbate both the downwind and crosswind effects of adjacent wind turbine assemblies, and induce higher levels of discontinuity to the incident wind of the partially shaded adjacent downwind and crosswind turbines. Current practice is to space these adjacent wind turbines at a distance of 10× rotor diameters for downwind turbines and 5× rotor diameters for crosswind turbines. It is a well-known phenomenon that both downwind and crosswind turbines are less reliable than the front row lead turbines in a large wind farm.

The low reliability of gears, blades, bearings and generators makes it difficult to offer more than a one-year warranty, generates large warranty payments caused by failed components, and creates substantial downtime and inability to meet mean-time-to-repair (MTTR) expectations. The failure rate data compiled by the European Wind Energy Association (EWEA) shows an average of under 7400 hours mean-time-between failure (MTBF) occurring in a sample population of 6000+ wind turbines, with an average MTTR of 17 days or more. This indicates that, during a period of one year, any individual wind turbine can be expected to be shut down for repairs for an average period of up to 17 days.

Many systems cannot operate in a cost effective manner in less than US DOE/National Renewable Energy Laboratory Class 4 wind conditions (~5.8 m/sec ref 10 m elevation). Additionally, purchases of new wind turbines declines rapidly without the availability of subsidized support from the federally-mandated Production Tax Credit (~1.9¢/kWh). Finally, profitable operation is not generally possible, even in Class 4 winds, without Investment Tax Credits and allowances for Double Declining Depreciation and amortization schedules of up to 30 years.

Existing prior art wind turbines suffer from a number of liabilities other than their exceptionally poor efficiency, poor economics, and serious reliability problems. These additional liabilities are related to sensory impact on the local population residing in the vicinity of the wind farm. They include both audible noise level generation and inaudible infrasonic noise, which can travel for many miles; unsightliness and obstruction of view from the towers, rotor blade flicker; and the kill-rate of birds and bats. Setback requirements in populated areas are typically a minimum of five to ten rotor diameters, using large tracts of land. For these reasons, a prevailing "Not In My Back Yard" (NIMBY) set of objections make the permitting processes for gaining wind farm site acceptance a generally long and arduous affair.

OBJECTIVES OF THE INVENTION

The objectives of this invention are to provide a novel banded wind turbine configuration that successfully addresses the current deficiencies of the prior art design configurations previously described. These, and other features and advantages of the present invention, will become apparent to those of ordinary skill in the art in view of the following drawing descriptions and detailed descriptions of the preferred embodiment and it's related features.

DETAILED DESCRIPTION OF THE EMBODIMENTS

Figures 1A, 1B:
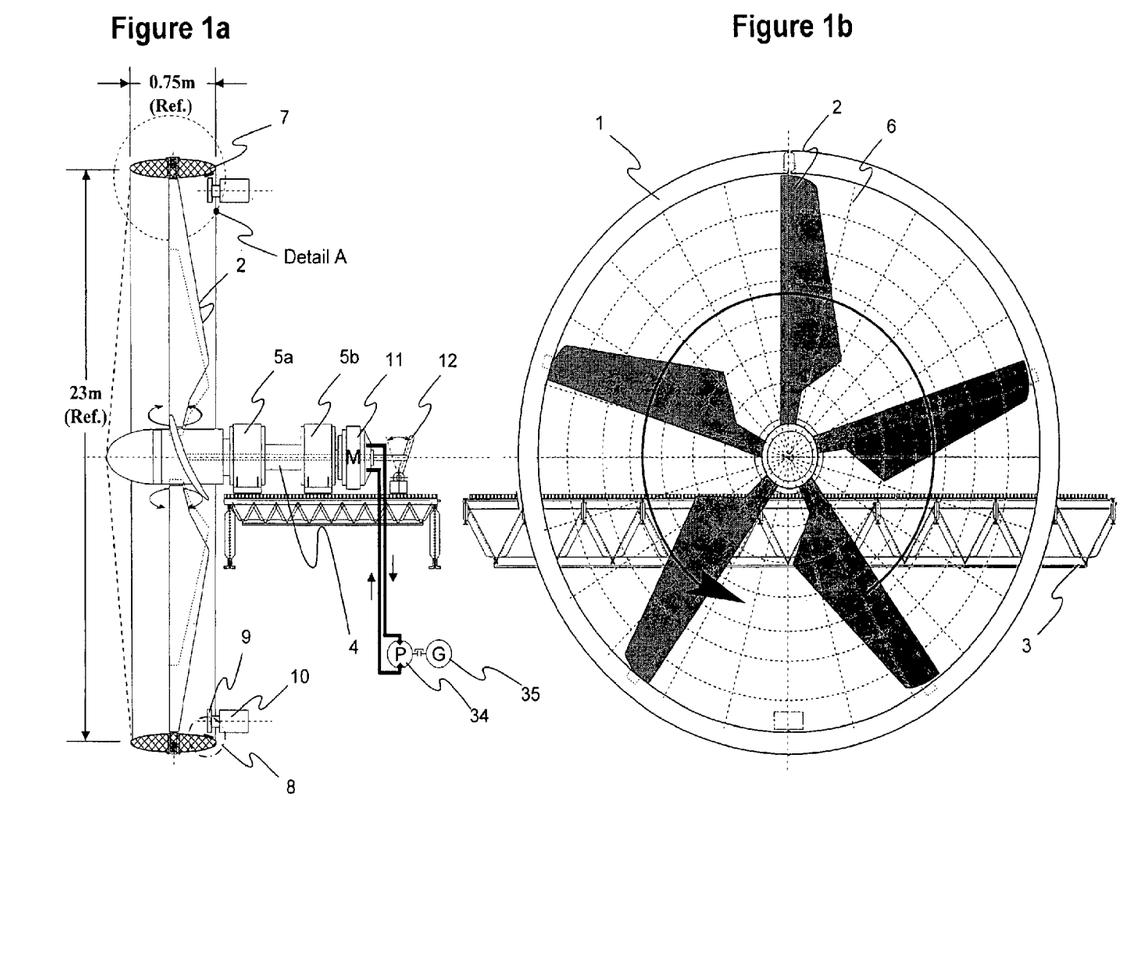
FIGS. 1a and 1b depict side and front elevation views of a nominal 23 m diameter banded turbine configuration.

FIGS. 1a and 1b depict side and front elevation views of a nominal 23 m diameter banded turbine configuration of up to nine blades (2), and depicted as resting on an Open Web Steel Joist (OWSJ) platform (3). FIG. 1a depicts a banded turbine configuration (1) supported off of a main shaft hub assembly (4), which is itself supported by forward and aft pillow block bearing assemblies (5a) and (5b). The banded turbine (1) allows for a protective screen (6) for bird- and bat-kill prevention. Two alternative means of power takeoff are illustrated (10) and (11).

The first alternative for power takeoff employs a multiplicity of bar magnets mounted uniformly about the interior rear of the outer band (7) to act as "teeth" (8). A complementary set of high-strength Neodymium Iron Boron N50 permanent magnets is contained in a set of smaller diameter planetary takeoff pulleys (9) arrayed about the interior perimeter of the outer band (7). The magnetic poles are oriented to establish a state of repulsion between the outer band (7) and that of the planetary takeoff pulleys (9). All the outer band (7) bar magnets have the N pole facing inwards, and all the bar magnets on the planetary takeoff pulleys (9) have the N pole facing outwards. The pitch spacing intervals for the planetary takeoff pulleys is such that there exists a magnetic null (<50 Gauss, vs. a surface field strength of ~5000 Gauss) between the respective magnetic "teeth". Drive Torque and RPMs are coupled to the respective planetary takeoff in inverse proportion to the diameter between the outer band (7) and the diameter of the planetary takeoff pulleys (9), to effect a single-stage high-ratio speed increase with zero tooth contact and requiring no lubrication. Torque is coupled across an air gap of ~0.50 inches via magnetic field sheer forces, rather than by conventional high tolerance tooth meshing with line-of-contact stress generation. Each of the planetary takeoff pulleys (9) drives a high efficiency DC alternator (10).

The first alternative for power takeoff employs a multiplicity of bar magnets mounted uniformly about the interior rear of the outer band (7) to act as "teeth" (8). A complementary set of high-strength Neodymium Iron Boron N50 permanent magnets is contained in a set of smaller diameter planetary takeoff pulleys (9) arrayed about the interior perimeter of the outer band (7). The magnetic poles are oriented to establish a state of repulsion between the outer band (7) and that of the planetary takeoff pulleys (9). All the outer band (7) bar magnets have the N pole facing inwards, and all the bar magnets on the planetary takeoff pulleys (9) have the N pole facing outwards. The pitch spacing intervals for the planetary takeoff pulleys is such that there exists a magnetic null (<50 Gauss, vs. a surface field strength of ~5000 Gauss) between the respective magnetic "teeth". Drive Torque and RPMs are coupled to the respective planetary takeoff in inverse proportion to the diameter between the outer band (7) and the diameter of the planetary takeoff pulleys (9), to effect a single-stage high-ratio speed increase with zero tooth contact and requiring no lubrication. Torque is coupled across an air gap of ~0.50 inches via magnetic field sheer forces, rather than by conventional high tolerance tooth meshing with line-of-contact stress generation. Each of the planetary takeoff pulleys (9) drives a high efficiency DC alternator (10).

Figure 2:
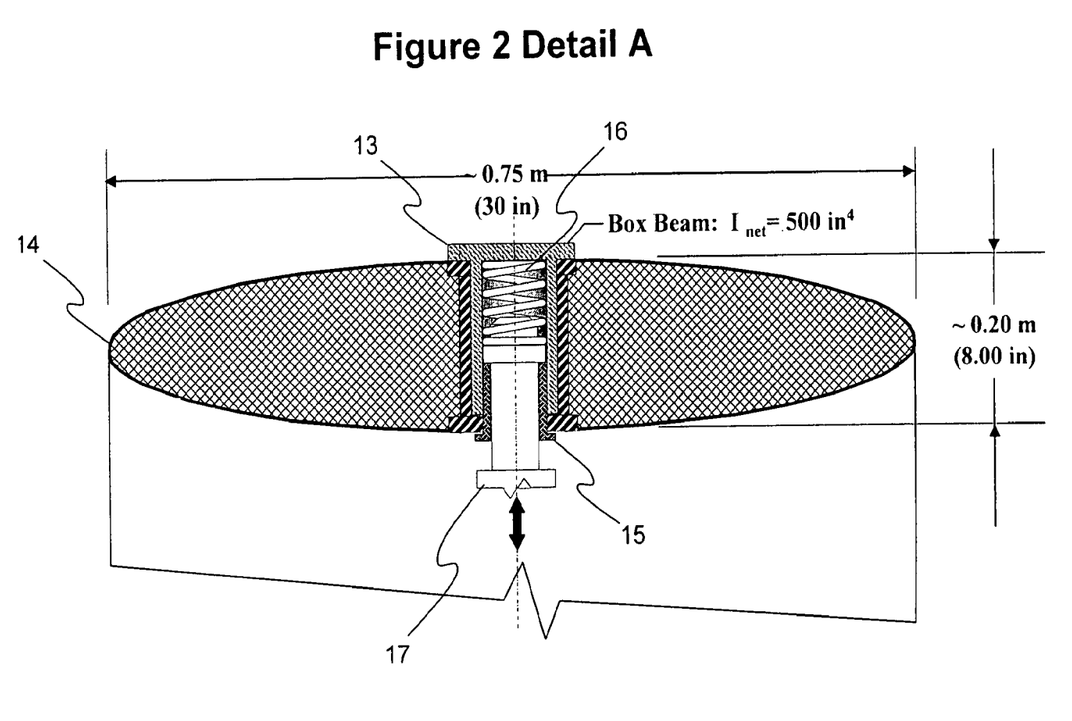
FIG. 2 provides an enlargement Detail A of the Band Cross-Sectional view in FIG. 1.

FIG. 2 provides an enlargement Detail A of the Band Cross-Sectional view in FIG. 1. It illustrates a preferred means to accommodate thermal expansion/contraction effects on the blades and their attachment to the outer band (shroud), over large temperature differences, while still allowing for blade pitch adjustment and structural connectivity to that of the outer band itself. Additional details are illustrated for the box beam composite structural reinforcing element (13) and the non-lubricated sleeve-bearing element (15) with the associated lightweight aerodynamic fairing (14). A spring preloading element (16) serves to center the outer band (7) concentric to the center of rotation about the main shaft (4) by placing the blades (2) into longitudinal compression at the blade tip attachment point (17).

Figure 3A:
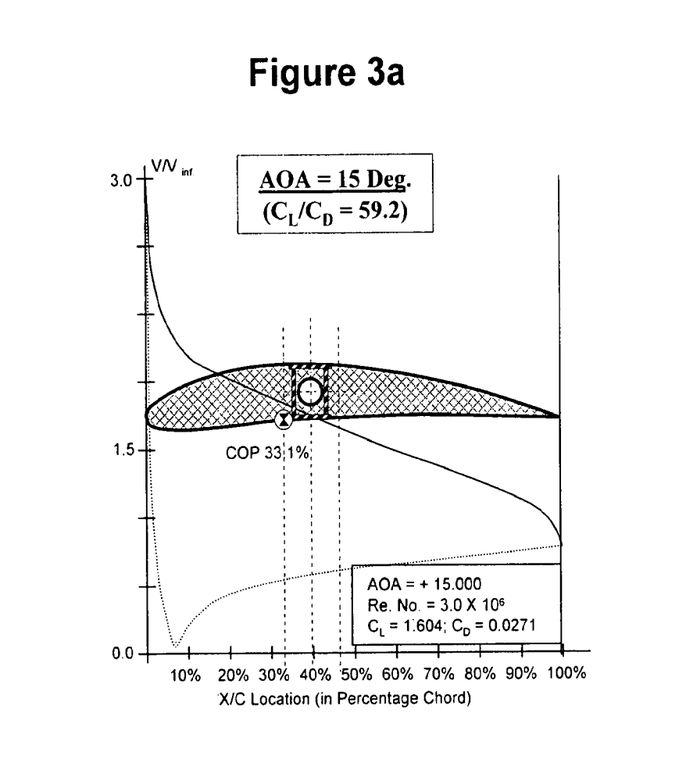
FIGS. 3a and 3b depict the performance curves at 15 degrees and 0 degrees angle of attack, respectively, for the preferable thin cross-section blades (2) for the banded turbine (1).
Figure 3B:
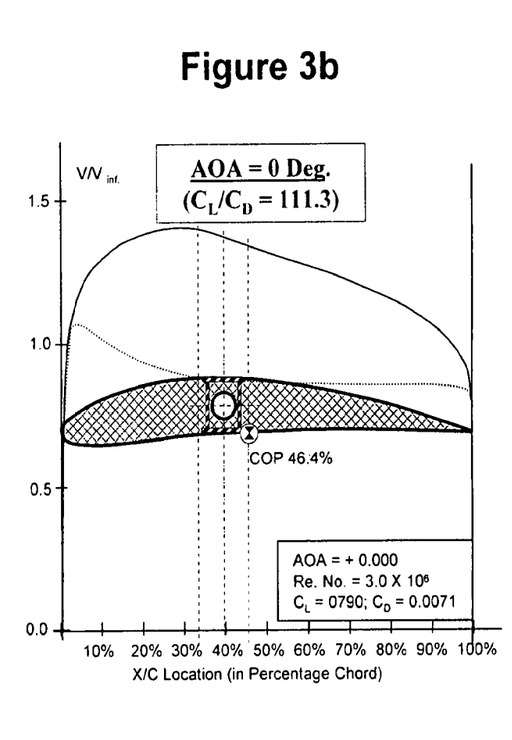

FIGS. 3a and 3b depict the performance curves at 15 degrees and 0 degrees angle of attack, respectively, for the preferable thin cross-section blades (2) for the banded turbine (1), similar to a NACA 6412 profile or better. The curves show that the lift/drag coefficient is better than 66 on the average as the blade Angle of Attack (AOA) varies from zero to fifteen degrees. Of particular note is that the COP varies only from 33.1% to 46.4% chord from 15 degrees to 0 degrees angle of attack.

Figure 4:
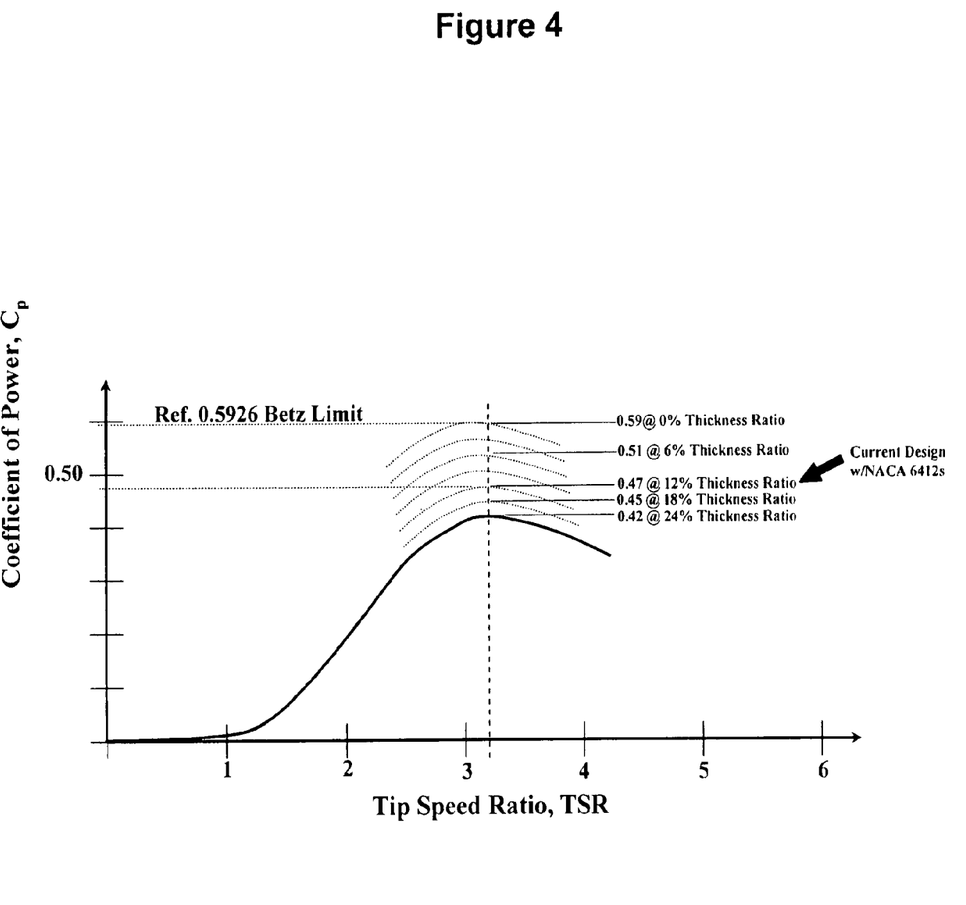
FIG. 4 depicts the relationship between the Coefficient of Performance (Cp) and the Tip Speed Ratio (TSR).

FIG. 4 depicts the relationship between the Coefficient of Performance (Cp) and the Tip Speed Ratio (TSR), and highlights the impact of varying the blade profile thickness to effect a reduction in aerodynamic crag. As shown on this graph, we can achieve a higher Coefficient of Power by reducing blade thickness.

Figure 5:
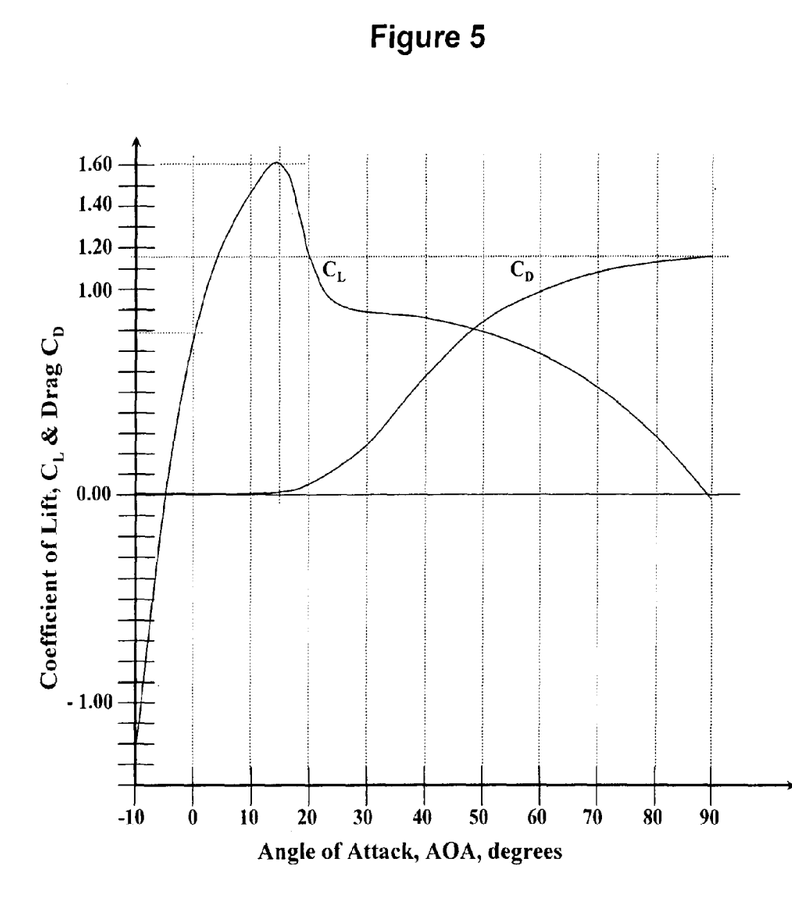
FIG. 5 depicts a plot of the lift-versus-drag for varying angles of attack (AOAs).

FIG. 5 depicts a plot of the lift-versus-drag for varying angles of attack (AOAs) and the indicated potential to achieve a minimum 1.5× improvement vs. prior art blade designs.

Figure 6:
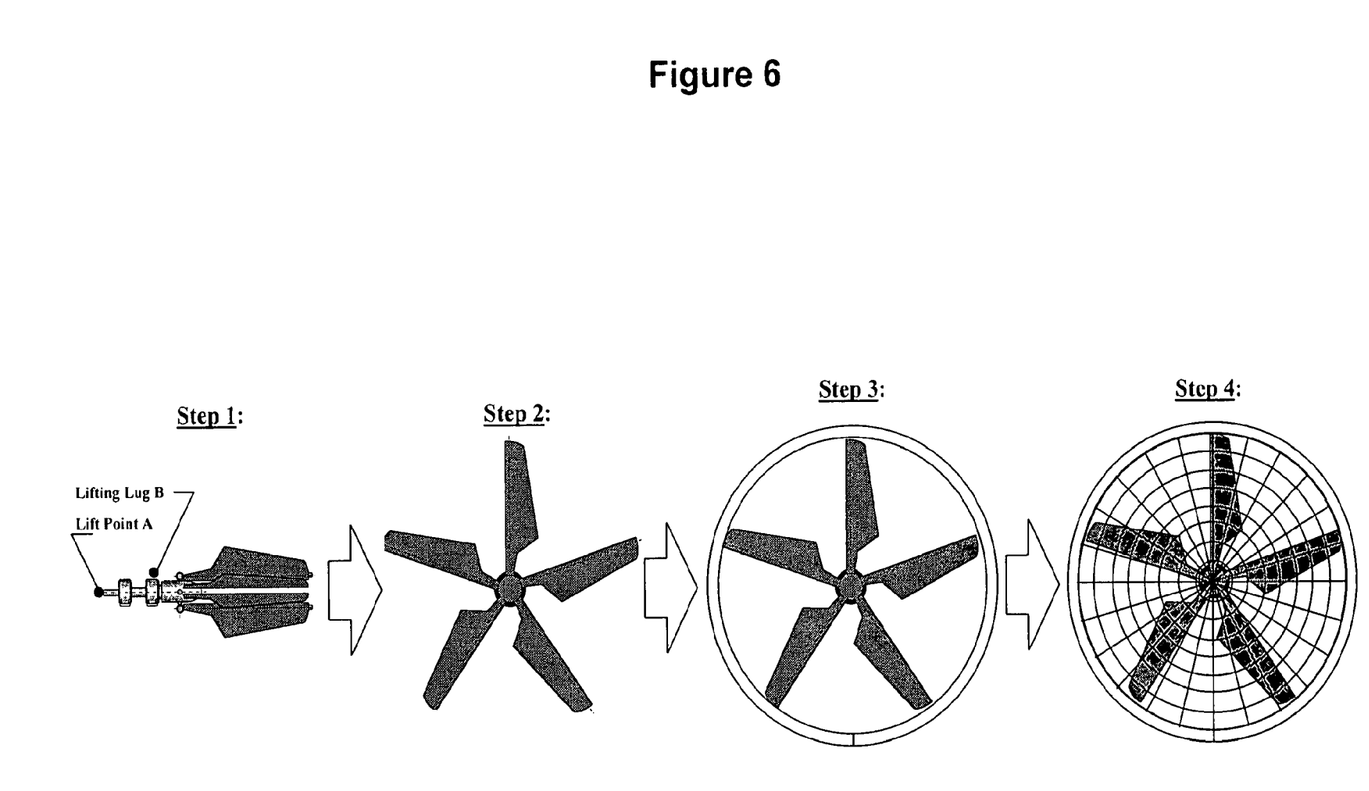
FIG. 6 depicts a preferred sequential approach to assembling a banded turbine (1).

FIG. 6 depicts a the preferred sequential approach to assembling a banded turbine (1): preparing it for shipment in a preferred ISO cargo container, Step 1; removal from the ISO container and pivoting the blades to their full-open position, Step 2; attachment of the outer band (7) segments, Step 3; and final attachment of a protective screen (6) for bat and bird-kill prevention, Step 4.

Figure 7A:
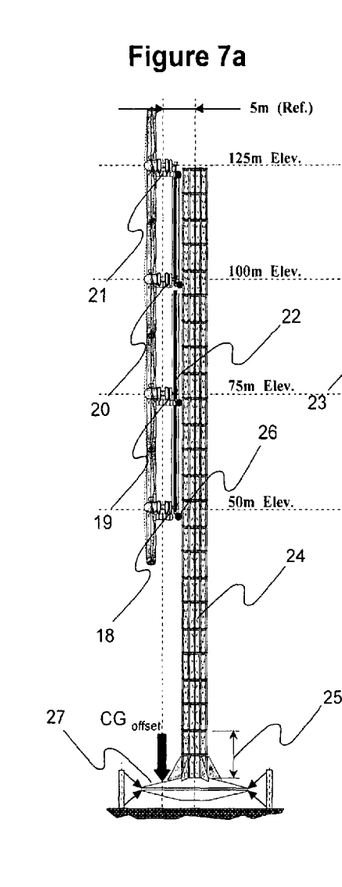
FIGS. 7a and 7b depict the side and front elevation views, respectively, of a large-scale 5-MW size vertical array consisting of a set of twelve 23 m-diameter banded turbines.
Figure 7B:
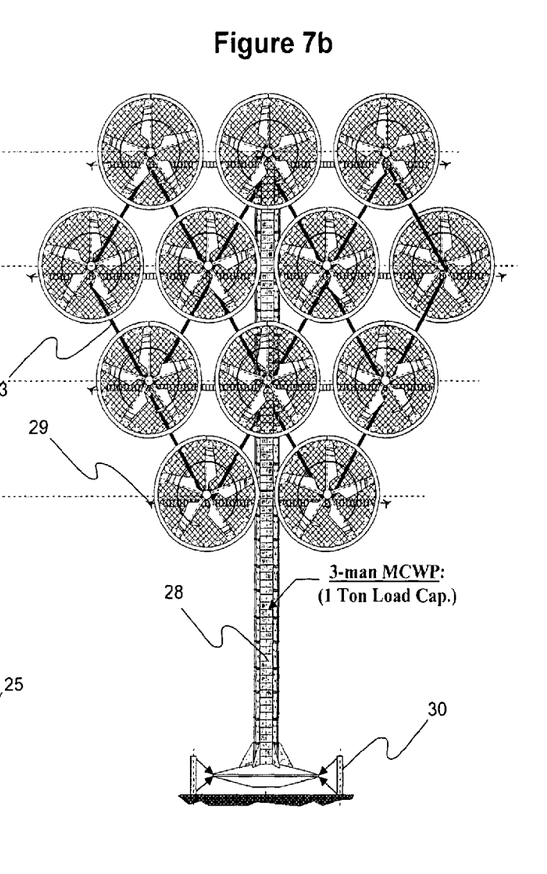

FIGS. 7a and 7b depict the side and front elevation views, respectively, of a large-scale 5-MW size vertical array consisting of a set of twelve 23 m-diameter banded turbines, with two mounted into the lower most OWSJ platform tier (18) weighing ~5.4 tons, three into the second OWSJ platform tier (19) weighing ~8.1 tons, four mounted onto the third OWSJ platform tier (20) weighing ~10.8 tons, and three mounted on the fourth OSWJ platform tier (21) weighing ~8.1 tons. The vertical array configuration is similar to that disclosed by William E. Heronemous (Ref. U.S. Pat. No. 6,749,399 and U.S. Pat. No. 7,075,189). The banded turbine (1) configuration mitigates generation of blade-tip turbulent eddies and swirl effects and their possible interaction between closely-spaced adjacent wind turbine blade tips, and thereby allows for close and efficient placement of multiple banded turbines (1) onto a lightweight space frame support structure (22) weighing ~55 tons.

The space frame support structure (22) preferably consists of the four platform tiers (18, 19, 20, and 21) and includes a set of 16 each columnar load-bearing struts (23) weighing ~1.4 tons. Each cross brace, or strut (23), is ~92 ft. long and capable of sustaining a column loading of 25 tons or better with stress levels below 16,400 psi, arranged in an equilateral space frame structure for support of all four sets of platform tiers. A set of four load-transfer connection points (26) is located on the supporting mast (24). The supporting mast (24) consists of a set of up to eleven 40-ft. tall modules (25) weighing ~6.4 tons each. The tower base (27), weighing ~50 tons, is depicted as providing a large-diameter bearing element for load distribution of induced Over Turning Moments and Base Shear Forces, and reaction of same into the outside perimeter foundation (30). A three-man, 1500# capacity Mast Climbing Work Platform (MCWP) (28) is provided to permit access to all levels of the mast structure (including the four platform levels) to facilitate ease of maintenance. Sets of anemometers (29) are located at each platform tier level to provide precise information on wind velocity (for turbine blade pitch control feedback information) at each respective level, and also wind direction. A control algorithm determines when the entire tower must yaw to orient itself into the new wind direction.

Figures 8A, 8B:
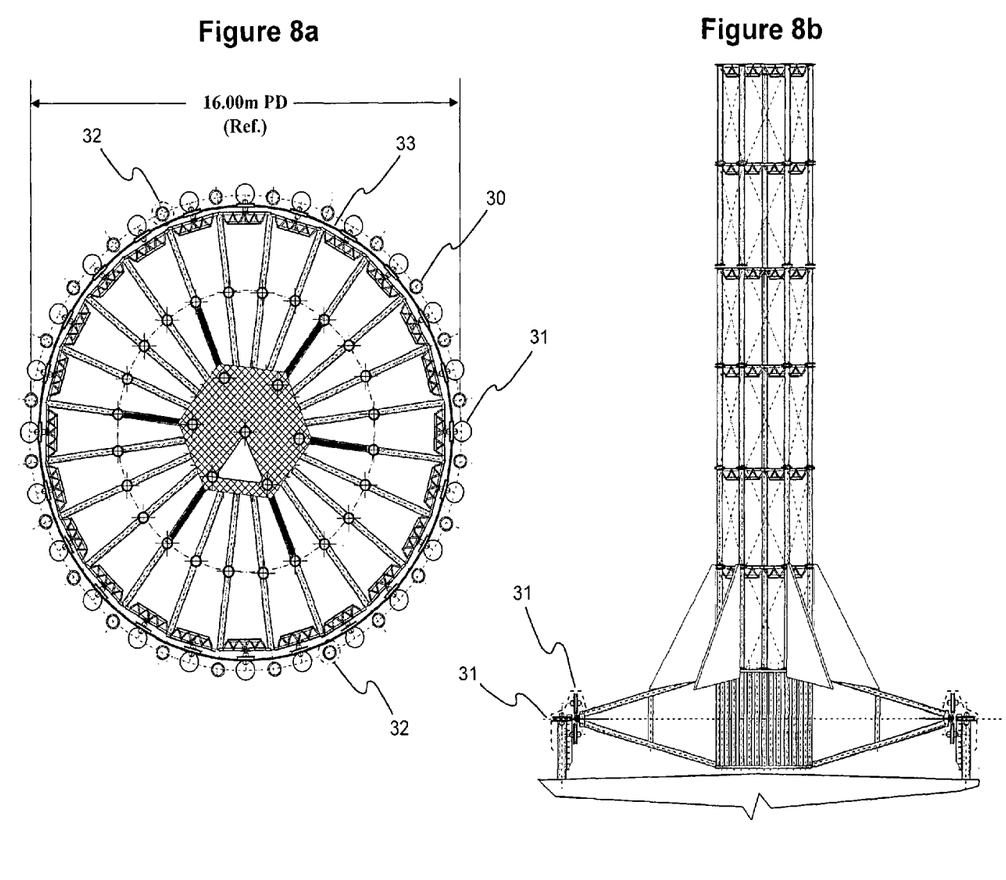
FIG. 8a depicts a cross-sectional view of the tower base showing the inner structural detail for the tower base (27), depicted in front view in FIG. 8b.

FIG. 8a depicts a cross-sectional view of the tower base showing the inner structural detail for the tower base (27), depicted in front view in FIG. 8b. Three sets of 24 load-bearing railroad bogie castor elements (31) are shown, arrayed uniformly at 15 degree intervals about the nominal 16 m-diameter perimeter of the tower base (27) and above and below the outer perimeter railroad track (standard rail at 130#/yard) "flanges" (33). The supporting mast (24), with base (27), space frame support structure (22), and banded turbine (1) assemblies is allowed to yaw as a single structure, using the distributed bearing capabilities of the multiplicity of railroad bogie castor elements. Dual 25 SHP hydraulic motors (32) are used to rotate the entire tower at slewing rates of up to 1.2 degrees per second to rapidly orient the tower to the new wind direction, by overcoming tower inertia of ~30×10$^6$ kg-m$^2$ over a 5-second acceleration/deceleration period, to reach a slewing rate of ~0.2 RPM or 1.2 degrees/sec. The banded turbines (1) are configured so that half rotate in the clockwise direction and half rotate in the counterclockwise direction, to eliminate any precession forces being generated during a slewing event.

The banded turbine (1) support structure (7) for HAWTs facilitates the achievement of significantly higher efficiency of operation and yields an average annual coefficient of performance (Cp) of >50% versus prior art embodiments of ~30% or less. This banded support structure (7) provides two-point support for the individual blades (2), thereby greatly reducing the associated deflection amplitudes to ~1/16$^{th}$ of prior art designs, along with reducing the associated cyclic stresses imposed on the individual blades (2) as they pass through Top Dead Center and Bottom Dead Center of the rotor disc swept area. This reduction in imposed deflection amplitudes and stresses facilitates employment of a more optimal blade NACA profile, one with a longer chord and reduced section thickness. The result is a much higher (1.5× or greater) lift-to-drag ratio versus prior art embodiments. Additionally, advantageous use of the banded support structure (7) enables the integration of an increased number of blades (2), resulting in a synergistic structural entity—one that is capable of minimizing the imposed dynamic stresses for both the banded support structure and the blade elements themselves. These greatly reduced stresses permit the selection of lower cost alternative manufacturing methods and the choice of inexpensive and lightweight materials of construction. The increased number of blades, either 5, 7, or 9, versus the prior art of 3-blade wind turbines, reduces the Tip Speed Ratio (TSR) from 6.4 to 3.2, 2.29, or 1.78 respectively, with a resultant minimum noise reduction of 30 dB(A).

Not only is it possible to use an optimal blade NACA profile, but a frontal blade projected area shape factor with the chord dimension directly proportional to the radial arm of the blade can also be employed, enabling this increased area to extract up to 90% of the wind energy from the outer 50% of the rotor disc swept area, versus prior art designs that are capable of only using the ~outer 30% of the rotor disc swept area. Combined with the higher efficiency blade design, a net 2.5× improvement in wind energy extraction may be realized with a banded turbine having the same overall swept area as the prior art wind turbines. This higher efficiency leads directly to the capability to operate economically in Class 3, wind sites versus the current limitation for economical operation in Class 4 wind sites. There are approximately four times more Class 3 wind sites than Class 4 sites available in the US, and this new capability greatly expands the potential for wind energy development.

The banded turbine (1) is preferably 23 m in diameter and provides 240 kW output at 12 meter/second wind velocity and 560 kW output at a maximum rated 16 meters/second wind velocity. The RPMs at each of the wind speeds may be found by: RPM=TSR×Vel. wind×60/(π×23 m diameter) The torque levels are quite large at maximum rated output, and are inversely proportional to the RPM of the wind turbine. Assuming an output of 560 kW, or 750 HP, 750 HP=Torque,in-lbs.×RPM/63025 where, RPM=42.5 @ TSR=3.2; 30.4 @ TSR=2.29 and 23.6 @ TSR=3.2 for a five-blade, seven blade or nine blade configuration. In a worst-case situation with the lowest RPMs requiring the highest torque, or 23.6 RPM with a nine-blade configuration, the resultant shaft torque output would be ~2×10$^6$ in.-lbs. Blade tip loading would therefore be 2×10$^6$ in-lb/(452 in. torque arm×9 blades) or ~500#. This transmitted torque is either applied at the outer band (7) of the wind turbine or taken directly off of the main shaft (4). The banded turbine (1) offers two different means for power takeoff.

The first means is realized by using the banded support structure (7). As a result of the geometric ratio between the rotor diameter outer magnetic "teeth" (8) and the power takeoff pulley (9) "teeth", the banded support structure (7) can function as an insitu high-ratio speed increaser assembly. The ratio between diameters is preferably ~75:1, and, assuming a total of 90 power takeoff pulleys (9) driving tandem ~6.00 KW alternator assemblies (10) at 1800 RPM requires a takeoff torque of ~300 in-lbs per power takeoff. This requires a magnetically-coupled shear force of 50# acting at the pitch diameter of the planetary power takeoff pulley, acting across an air gap of ~0.50 inches. The banded support structure (7) functions as a magnetically coupled "sun gear"—a single stage distributed planetary gear arrangement with multiple power takeoffs. Transmitted torque levels are thereby minimized and inversely proportional to the number of power takeoffs employed. The use of high strength Neodymium Iron Boron N50 magnets provides very high transmitted torque levels across a large air gap and eliminates tooth contact and lubrication. The bar magnets on both the outer band "bull gear" or the planetary takeoff pulleys (9) all face outward, either in the direction of all N or all S, in order to assure repulsion, with pitch spacing intervals such that an effective magnetic null is released between the respective teeth of the planetary takeoff pulley (9). The resultant speed-increasing gearbox is virtually without mass, except for the magnetic tooth features imbedded within the surface structures of the banded support structure and the associated planetary takeoff pulleys for driving a set of DC alternators. At the output current proportional to the RPM, DC alternators have essentially fixed output voltage, making them optimally suited to summing the voltage output from each alternator of an individual banded turbine and subsequently providing the summed output into a high efficiency solid state inverter to establish the desired 60-Hz, 3-phase AC voltage level required for grid connectivity.

The second alternative means for power takeoff uses Low Speed High Torque (LSHT) hydraulic motors (11) to realize a similar capability for adapting the banded turbine (1) to a conventional main shaft (4) power takeoff. The banded turbine would preferably consist of 5 blades (3.2 TSR or ~42.5 RPM), 7 blades (2.29 TSR or 30.4 RPM) or 9 blades (1.78 TSR or 23.6 RPM). Any of these configurations would provide for 240 kW output at 12 m/sec. wind velocity and 560 kW output at 16 m/sec. wind velocity (prior to furling to prevent overloading the drive train/power generations system). However, the employment of LSHT technology allows the selection of an extremely affordable, low cost, exceptionally high reliability (>320,000 hours B$_{10}$ lifetime) lightweight (<1.75 ton) speed changer with a high ratio (76.7:1 to 42.4:1, depending on main shaft RPMs). The ratio between the LSHT hydraulic drive motor displacement (in in$^3$/Rev) versus that of the driven variable displacement pump (in in$^3$/Rev.) is adjusted such that the desired generator shaft speeds can be maintained at a constant 1800 RPM, and remains synchronized to the grid frequency and operating voltage requirements.

By way of example, the banded turbine (1) would be rotating at an initial speed of ~6 RPM at a desired 4 m/sec. cut-in wind speed, assuming the use of a nine-bladed configuration, and producing an initial ~8.75 kW output power. Partitioning the output into a set of eight 75-kW motor/generators similar to the Baldor model P40G332, 3ø 460 VAC 405T frame premium efficiency motors operating at ~1820 RPM, would result in the stepwise capability to bring 75 kW increments of power online and directly into the grid. However, this is too coarse of a step for achieving an efficient power transfer from the wind turbine to the grid. Nevertheless, the desired result may be attained by using a dedicated set of up to 10 smaller size bridging motor/generators, similar to the Baldor model P25G3107, 3ø 460 VAC 256U frame, to permit increments of 7.5 kW to be brought online as needed in ever increasing steps of 7.5 kW increments as the banded turbine speeds up with higher wind velocities. Once all ten motor generators are operating, they are switched-off as each additional 75 kW motor generator is brought on line. This switchover constitutes a "bridging generator", offering much finer granularity (at 1% of output capacity) capable of matching the generator output to the specific amount of wind energy being extracted by the turbine. This configuration offers a nominal 10% overload capability for the 560 kW-rated turbine. Further refinement offers "fine-tuning" to any desired degree of fidelity.

Further advantageous use of the banded support structure (7) allows the application of a multiplicity of smaller wind turbine units placed closely adjacent to one another in a vertical array, similar to that disclosed by William E. Heronemus (Ref. U.S. Pat. No. 6,749,399 and U.S. Pat. No. 7,075,189). The banded turbine configuration mitigates the generation of blade-tip turbulent eddies and swirl effects and their possible interaction between closely spaced adjacent wind turbine blade tips, allowing for the close and efficient placement of a multiplicity of turbines onto a lightweight space frame support structure.

By way of example, in contrast to a prior art wind turbine embodiment such as the Vestas V80-2 MW, which has a swept area of 5,026 m$^2$, a vertical array configuration consisting of a total of 12 smaller banded turbines (1), 23 m in diameter, would have a comparable total swept area of 4,986 m$^2$. The resultant placement of these turbines would preferably be in a 2-3-4-3 vertical array, with the first tier of turbines located at hub height of 50 m, the second tier at 75 m, the third tier at 100 m and the fourth tier at 125 m. The resultant configuration would have an envelope similar to that of the Vesta swept area. However, unlike the Vesta rotor, which can only adapt to an averaged value of it's ~80 m hub height wind velocity, the banded turbine (1) configuration allows fine-tuning of the blade pitch for optimum efficiency at each of the respective tier elevations.

The differences in the respective banded turbine hub heights allows each turbine to take advantage of the wind velocities at its unique level above the ground, yielding the overall capability to extract up to 2.5× the wind energy from approximately the same swept area, or 5 MW. This output power level is achievable at a rated wind speed of 14 meters/sec. at an initial hub height of 50 m. It should be noted that a wind velocity of 14 meters/sec. is similar to prior-art wind turbine designs and is therefore a useful yardstick for performance comparisons between competing design approaches. However, when considering the higher wind velocity available at the upper tier levels, the banded turbine vertical array can provide up to 6720 kW peak output power (i.e., 12 each at 560 kW) from higher velocity winds than possible with the prior art designs, which are forced to feather their blades at wind velocities above 14 meters/sec. This peak power capability of the banded turbine allows for an 8% increase in the Annual Energy Product (AEP) capability at a Class 4 wind site for the nominally-rated 5 MW wind turbine array, boosting it up to ~14.71 MkWh/year.

Additionally, each banded turbine (1) would preferably employ DC alternators to provide a switchable output which is subsequently fed to a dedicated set of high efficiency grid-compatible solid state invertors or, alternatively, to energy storage means. This DC power could also be effectively used for localized stored energy systems consisting of batteries or (preferably) to operate low cost, high efficiency electrolyzers for the production of hydrogen. This solution employs dedicated sets of invertors for each of the individual wind turbines, such that the failure of any one turbine would only result in the loss of 1/12 the total power output capability being fed to the grid.

I claim:

1. A banded wind turbine configuration of a horizontal axis wind turbine, comprising:
a plurality of blades having respective roots mounted on a shaft hub assembly of the horizontal axis wind turbine and blade tips opposite said roots, the mounting of said blade roots to said shaft hub assembly providing primary support for the plurality of the blades; and
an integral outer band that rotates with said shaft hub assembly, said integral outer band being primarily supported by said plurality of blades at the blade tips, and said integral outer band having a connection with each said blade tip that permits rotation of the blades about an axis along a length of each of the blades to permit induced deflections and bending stresses of each of the blades that accommodates thermal expansion/contraction of each of the blades.

2. The banded wind turbine configuration of the horizontal axis wind turbine according to claim 1, further including screens for bat- and bird-kill prevention.

3. The banded wind turbine configuration of the horizontal axis wind turbine according to claim 1, wherein said outer band has sleeve bushings receiving respective ones of said blade tips to permit relative rotation of the blades.

4. The banded wind turbine configuration of the horizontal axis wind turbine according to claim 3, further including a spring preloading element in said sleeve bushing engaging the respective blade tips.

5. A wind turbine system, comprising:
a plurality of banded wind turbine assemblies of horizontal axis wind turbines mounted on a mast;
each said wind turbine assembly having
a plurality of blades having respective roots mounted on a shaft hub assembly of the horizontal axis wind turbine and blade tips opposite said roots, the mounting of said blade roots to said shaft hub assembly providing primary support for the plurality of the blades, and
an integral outer band that rotates with said shaft hub assembly said integral outer band being primarily is supported by said plurality of blades at the blade tips, and said integral outer band having a connection with each said blade tip that permits rotation of each of the blades about an axis along a length of each of the blades to permit induced deflections and bending stresses of each of the blades that accommodates thermal expansion/contraction of each of the blades.

6. The wind turbine system according to claim 5, wherein said mast is a space frame support structure that supports at least two of said banded wind turbine assemblies at each of at least two vertically spaced apart levels.

7. The wind turbine system according to claim 6, wherein said mast has a base having an outer perimeter railroad track that engages a plurality of post mounted load-bearing railroad bogie castor elements that enable relative rotation between the mast base and the post-mounted castor elements and wherein the mast, the base, the frame support structure and the banded turbine assemblies are permitted to yaw as a single structure.

8. The wind turbine system according to claim 5, wherein transmitted torque is applied at each said outer band of each of the banded wind turbine assemblies as a large ratio single stage sun gear magnetically driving a multiplicity of planetary power takeoffs for distributed power generation.

9. The wind turbine system according to claim 5, wherein transmitted torque is applied at shafts of the banded turbine assemblies and transmitted to respective pump displacements for driving generator units.

10. The wind turbine system according to claim 5, further including screens for bat- and bird-kill prevention.

11. The wind turbine system according to claim 5, wherein the banded wind turbines are integrated into a large scale vertical array of 12 banded wind turbines.

12. The wind turbine system according to claim 5, wherein said outer band of each of the banded wind turbines has sleeve bushings receiving respective ones of said blade tips to permit relative rotation of the blades.

13. The wind turbine system according to claim 12, further including for each of the banded wind turbines a spring preloading element in said sleeve bushing engaging the respective blade tips.

\* \* \* \* \*